United States Patent Office 2,903,449
Patented Sept. 8, 1959

---

2,903,449

PROCESS FOR PREPARING 21-FLUORO STEROIDS OF THE PREGNANE SERIES

Josef Fried and Josef E. Herz, New Brunswick, N.J., assignors to Olin Mathieson Chemical Corporation, New York, N.Y., a corporation of Virginia No Drawing. Application April 18, 1957
Serial No. 653,517

15 Claims. (Cl. 260—239.55)

This application is a continuation-in-part of our parent applications Serial Nos. 583,934, 585,155, 598,539 and 599,310, filed May 10, 1956; May 16, 1956; July 18, 1956; and July 23, 1956, respectively.

This invention relates to the synthesis of valuable steroids and has for its object the provision of an advantageous process for preparing 21-fluoro steroids of the pregnane (including the pregnene and pregnadiene) series.

The process of this invention essentially comprises converting a 21-organic sulfonic acid ester of a 21-hydroxy steroid of the pregnane series to its corresponding 21-fluoro derivative.

Suitable initial reactants utilizable in the process of this invention include the organic sulfonic acid esters, such as the aryl sulfonic acid esters (e.g., p-tolylsulfonic acid ester), and particularly the alkane sulfonic acid esters (e.g., the lower alkane sulfonic acid esters, as exemplified by methane sulfonic acid) of certain 21-hydroxy steroids. These steroids are exemplified by such 9α-halo-21-hydroxy steroids as: 9α-halohydrocortisones; 9α-halocortisones; 9α-halocorticosterones; 9α-halo-11-dehydrocorticosterones; 9α-halo-$\Delta^{1,4}$-pregnadiene-11β,17α,21-triol-3,20-diones; 9α-halo-$\Delta^{1,4}$-pregnadiene-17α,21-diol-3,11,20-triones; 9α-halo-$\Delta^{1,4}$-pregnadiene-11β,21-diol-3,20-diones; 9α-halo-$\Delta^{1,4}$-pregnadiene-21-ol-3,11,20-triones; 9α-halo-2-methylhydrocortisones; 9α-halo-2-methylcortisones; 9α-halo-6α-methylhydrocortisones; 9α-halo-6α-methylcortisones; 9α-halo-16α-hydroxyhydrocortisones; 9α-halo-16α-hydroxycortisones; 9α-halo-$\Delta^{1,4}$-pregnadiene-11β,16α,17α,21-tetraol-3,20-diones; 9α-halo-$\Delta^{1,4}$-pregnadiene-16α,17α,21-triol-3,11,20-triones; 9α-halo-6α-methyl-$\Delta^{1,4}$-pregnadiene-11β,17α,21-triol-3,20-diones; and 9α-halo-6α-methyl-$\Delta^{1,4}$-pregnadiene-17α,21-diol-3,11,20-triones; by such 12α-halo-21-hydroxy steroids as: 12α-halo-hydrocortisones; 12α-halocortisones; 12α-halocorticosterones; 12α-halo-11-dehydrocorticosterones; 12α-halo-$\Delta^{1,4}$-pregnadiene-11β,17α,21-triol-3,20-diones; and 12α-halo-$\Delta^{1,4}$-pregnadiene-17α,21-diol-3,11,20-triones; by such 9,11-epoxy-21-hydroxy steroids as: 9β,11β-epoxy-$\Delta^{4}$-pregnene-17α,21-diol-3,20-dione; 9β,11β-epoxy-$\Delta^{4}$-pregnene-21-ol-3,20-dione; 9β,11β-epoxy-$\Delta^{1,4}$-pregnadiene-17α,21-diol-3,20-dione; and 9β,11β-epoxy-$\Delta^{1,4}$-pregnadiene-21-ol-3,20-dione; and by such other 21-hydroxy steroids as: $\Delta^{4}$-pregnene-17α,21-diol-3,20-dione (Reichstein's Compound S); $\Delta^{4}$-pregnene-21-ol-3,20-dione; hydrocortisone; cortisone; 16α-hydroxyhydrocortisone; 16α-hydroxycortisone; 1-dehydrohydrocortisone; 1-dehydrocortisone; 2-methylhydrocortisone; 2-methylcortisone; 6α-methylhydrocortisone; 6α-methylcortisone; 9α,11β-dihydroxyhydrocortisone; 6α-methyl-$\Delta^{1,4}$-pregnadiene-11β,17α,21-triol-3,20-diones; and 6α-methyl-$\Delta^{1,4}$-pregnadiene-17α,21-diol-3,11,20-triones.

The preferred starting materials are those of the general formula

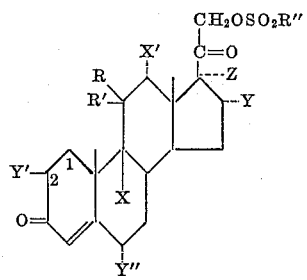

wherein the 1,2-position is saturated or double-bonded, R is hydrogen, R' is hydrogen or β-hydroxy or together R and R' is keto, X is hydrogen, α-hydroxy, α-(lower alkoxy), α-halogen, or together with R' is β-epoxy, X' is hydrogen or α-halogen, Y is hydrogen or α-hydroxy, Y' and Y'' are hydrogen or methyl, Z is hydrogen or α-hydroxy, and R'' is an organic radical.

These 21-sulfonic acid esters can be prepared from the corresponding free 21-hydroxy derivatives by treating the latter with an organic sulfonyl halide (e.g., an aryl sulfonyl halide, as exemplified by tosyl chloride, and preferably an alkane sulfonyl halide, as exemplified by mesyl chloride), the reaction being conducted by intermixing the steroid and sulfonyl halide under substantially anhydrous conditions and preferably in the cold (e.g., at a temperature less than about 20° C.), in the presence of pyridine or other organic base.

To prepare the 21-fluoro derivatives, the 21-organic sulfonyloxy derivatives are reacted with inorganic fluoride salt, particularly an alkali metal fluoride, in an organic solvent of high dielectric constant, such as dimethylformamide, dimethylsulfoxide and diethylene glycol. This reaction is preferably, but not necessarily, conducted at an elevated temperature, a temperature range of 80–130° C. being particularly preferred. Although any alkali metal fluoride may be used, it has been found that by using an alkali metal bifluoride (e.g., potassium bifluoride, $KHF_2$) as the fluorinating agent, the yield of the desired 21-fluoro derivative can be increased more than two-fold over that obtainable when a simple fluoride, such as potassium fluoride, is employed.

As stated in the applications listed hereinbefore, the 21-fluoro compounds having an 11β-hydroxy or 11-keto substituent are physiologically active steroids possessing glucocorticoid activity, whereas those containing a 9β,11β-epoxy group are useful as intermediates in the preparation of the physiologically active 9α-halo-11β-hydroxy derivatives, and those unsubstituted in the 11-position are active as mineralocorticoids.

The following examples are illustrative of the invention (all temperatures being in Centigrade):

EXAMPLE 1

*9α,21-difluoro-$\Delta^{4}$-pregnene-11β,17α-diol-3,20-dione*

To a solution of 200 mg. of 9α-fluorohydrocortisone 21-mesylate in 5 ml. of redistilled dimethylformamide is added 200 mg. of anhydrous potassium fluoride and the resulting suspension heated with stirring at 110° for 18 hours. The mixture is concentrated to small volume, taken up in water and extracted with ethyl acetate. The ethyl acetate extract is in turn extracted with water and the solvent removed in vacuo. The residue is triturated with chloroform and the chloroform-insoluble precipitate recrystallized from 95% alcohol. Pure 9α,21-difluoro-$\Delta^{4}$-pregnene-11β,17α-diol-3,20-dione is obtained in about 25% yield and has the following properties: M.P. about 259–261°; $[\alpha]_D^{23}$ +147° (c., 0.3 in dioxane), +134° (c., 0.53 in acetone);

$\lambda_{max.}^{alc.}$ 239 m$\mu$ ($\epsilon$=16,400); $\lambda_{max.}^{Nujol}$ 2.89$\mu$, 3.04$\mu$, 5.84$\mu$, 6.01–6.05$\mu$

*Analysis.*—Calculated for $C_{21}H_{28}O_4F_2$ (382.43): C, 65.95; H, 7.38; F, 9.94. Found: C, 65.96; H, 7.43; F, 9.87.

The procedure of Example 1 can be conducted with dimethylsulfoxide or diethylene glycol instead of dimethylformamide to give the same results.

EXAMPLE 2

To a solution of 50 g. of 9$\alpha$-fluorohydrocortisone 21-mesylate in 1250 ml. of redistilled dimethylsulfoxide is added 50 g. of anhydrous potassium bifluoride ($KHF_2$) and the mixture heated at 100° (temp. of the liquid) with agitation for 14 hours. After cooling 2 liters of ice water are added and the mixture filtered after 3 hours in the refrigerator. The filter cake is washed with water and dried in vacuo at 60°. The dried crystals (36.6 g.) are heated at reflux with 150 ml. of chloroform for 10 minutes, cooled in the refrigerator and the suspension filtered and washed with chloroform. The dried filter cake (about 23.2 g., 55% yield) represents essentially pure 9$\alpha$,21 - difluoro - $\Delta^4$ - pregnene - 11$\beta$,17$\alpha$ - diol - 3,20-dione,, which is further purified by recrystallization from acetone. The pure material melts at about 275–278°.

Other solvents which may be used in the reaction are dimethylformamide and diethylene glycol.

EXAMPLE 3

*9$\alpha$,21-difluoro-$\Delta^{1,4}$-pregnadiene-11$\beta$,17$\alpha$-diol-3,20-dione*

To a solution of 217 mg. of 9$\alpha$-fluoro-$\Delta^{1,4}$-pregnadiene-11$\beta$,17$\alpha$,21-triol-3,20-dione 21-mesylate in 10 ml. of dimethylformamide is added 220 mg. of anhydrous potassium fluoride. Reaction conditions are the same as Example 1. The residue from the ethyl acetate extract is triturated with chloroform and the insoluble powder recrystallized from 95% ethanol. The resulting pure 9$\alpha$,21-difluoro-$\Delta^{1,4}$-pregnadiene-11$\beta$,17$\alpha$-diol-3,20-dione has the following properties: M.P. about 281–283°; $[\alpha]_D^{23}$ +115° (c., 0.35 in dioxane);

$\lambda_{max.}^{alc.}$ 238 m$\mu$ ($\epsilon$=15,500); $\lambda_{max.}^{Nujol}$ 3.03$\mu$, 5.75$\mu$, 6.05$\mu$, 6.21$\mu$, 6.26$\mu$

*Analysis.*—Calculated for $C_{21}H_{26}O_4F_2$ (380.41): C, 66.30; H, 6.79; F, 9.99. Found: C, 65.90; H, 7.17; F, 9.79.

EXAMPLE 4

*9$\alpha$,21-difluoro-$\Delta^4$-pregnene-17$\alpha$-ol-3,11,20-trione*

By substituting 200 mg. of 9$\alpha$-fluorocortisone 21-mesylate for the 9$\alpha$-fluorohydrocortisone 21-mesylate in the procedure of Example 1, there is obtained 9$\alpha$,21-difluoro-$\Delta^4$-pregnene-17$\alpha$-ol-3,11,20-trione.

EXAMPLE 5

*9$\alpha$,21-difluoro-$\Delta^{1,4}$-pregnadiene-17$\alpha$-ol-3,11,20-trione*

By substituting 217 mg. of 9$\alpha$-fluoro-$\Delta^{1,4}$-pregnadiene-17$\alpha$,21-diol-3,11,20-trione 21-mesylate for the 9$\alpha$-fluoro-$\Delta^{1,4}$-pregnadiene-11$\beta$,17$\alpha$,21-triol-3,20,dione 21-mesylate in the procedure of Example 3, there is obtained 9$\alpha$,21-difluoro-$\Delta^{1,4}$-pregnadiene-17$\alpha$-ol-3,11,20-trione.

EXAMPLE 6

*21-fluoro-9$\beta$,11$\beta$-epoxy-$\Delta^4$-pregnene-17$\alpha$-ol-3,20-dione*

200 mg. of 9$\beta$,11$\beta$-epoxy-$\Delta^4$-pregnene-17$\alpha$,21-diol-3,20-dione 21-mesylate and 200 mg. of anhydrous potassium fluoride are reacted in 12 ml. of freshly distilled dimethylformamide, as described in Example 1. Two recrystallizations of the total residue from the ethyl acetate extract from acetone-hexane yields pure 21-fluoro-9$\beta$,11$\beta$-epoxy-$\Delta^4$-pregnene-17$\alpha$-ol-3,20-dione of the following properties: M.P. about 245–246°; $[\alpha]_D^{23}$ −11.5° (c., 0.37 in acetone);

$\lambda_{max.}^{alc.}$ 243 m$\mu$ ($\epsilon$=15,500); $\lambda_{max.}^{Nujol}$ 2.87$\mu$, 5.80$\mu$, 6.10$\mu$

*Analysis.*—Calculated for $C_{21}H_{27}O_4F$ (362.43): C, 69.59; H, 7.51; F, 5.24. Found: C, 69.50; H, 7.63; F, 5.26.

EXAMPLE 7

*21-fluoro-9$\beta$,11$\beta$-epoxy-$\Delta^{1,4}$-pregnadiene-17$\alpha$-ol-3,20-dione*

Following the procedure of Example 6, by substituting 9$\beta$,11$\beta$-epoxy-$\Delta^{1,4}$-pregnadiene-17$\alpha$,21-diol-3,20-dione 21-mesylate for the mesylate of the example, there is obtained 21 - fluoro - 9$\beta$,11$\beta$ - epoxy - $\Delta^{1,4}$ - pregnadiene-17$\alpha$-ol-3,20-dione.

EXAMPLE 8

*21-fluoro-2-methyl-11$\beta$,17$\alpha$-dihydroxyprogesterone*

A mixture containing 100 mg. of 2-methylhydrocortisone mesylate and 100 mg. of anhydrous potassium bifluoride in 4 ml. of freshly distiled dimethylformamide is heated under nitrogen at 110° for 17 hours. After removal of the bulk of the solvent in vacuo, the mixture is taken up in water, dried over sodium sulfate and the solvent removed in vacuo. The residual solid is then recrystallized from 95% alcohol.

EXAMPLE 9

*9$\alpha$,21-difluoro-2-methyl-11$\beta$,17$\alpha$-dihydroxyprogesterone*

Following the procedure of Example 8, but substituting 100 mg. of 9$\alpha$-fluoro-2-methylhydrocortisone mesylate for the 2-methylhydrocortisone mesylate, there is obtained 9$\alpha$,21-difluoro-2-methyl-11$\beta$,17$\alpha$-dihydroxyprogesterone.

Similarly 2-methylcortisone mesylate and 9$\alpha$-fluoro-2-methylcortisone mesylate yield 21-fluoro-2-methyl-11-keto - 17$\alpha$ - hydroxyprogesterone and 9$\alpha$,21 - difluoro - 2-methyl-11-keto-17$\alpha$-hydroxyprogesterone, respectively.

EXAMPLE 10

*21-fluoro-$\Delta^4$-pregnene-17$\alpha$-ol-3,20-dione*

A solution of 1.2 g. of $\Delta^4$-pregnene-17$\alpha$,21-diol-3,20-dione 21-mesylate and 1.2 g. of anhydrous potassium fluoride in 120 ml. of dimethylsulfoxide is heated with stirring at 110° for 18 hours. The mixture is diluted with water and the steroid extracted with ethyl acetate. The ethyl acetate extract is washed with water, dried over sodium sulfate and evaporated to dryness in vacuo. The residue on direct crystallization from acetone yields about 110 mg. of the 21-fluoro-$\Delta^4$-pregnene-17$\alpha$-ol-3,20-dione, having the following properties: M.P. about 224–226° and 233–235° (dimorphic); $[\alpha]_D^{23}$ +130° (c., 0.34 in chloroform);

$\lambda_{max.}^{alc.}$ 240 m$\mu$ ($\epsilon$=16,800); $\lambda_{max.}^{Nujol}$ 2.94$\mu$, 5.76$\mu$, 5.99$\mu$, 6.19$\mu$

*Analysis.*—Calculated for $C_{21}H_{29}O_3F$ (348.44): C, 72.32; H, 8.39; F, 5.45. Found: C, 72.37; H, 8.52; F, 5.50.

EXAMPLE 11

*21-fluoro-$\Delta^{1,4}$-pregnadiene-11$\beta$,17$\alpha$-diol-3,20-dione*

A solution of 1 g. of $\Delta^{1,4}$-pregnadiene-11$\beta$,17$\alpha$,21-triol-3,20-dione 21-mesylate and 1.0 g. of anhydrous potassium fluoride in 50 ml. of dimethylsulfoxide is heated at 110° with stirring for 24 hours. After cooling, the mixture is diluted with ice water and the resulting precipitate (about 570 mg.) filtered off and washed with water. The precipitate is separated by extraction with hot chloroform into the chloroform-insoluble 21-fluoro-$\Delta^{1,4}$-pregnadiene-11$\beta$,17$\alpha$-diol-3,20-dione and the chloroform-soluble 17$\alpha$,21-epoxide. The 21-fluoro-$\Delta^{1,4}$-pregnadiene-11$\beta$,17$\alpha$-diol-3,20-dione, on recrystallization from acetone, has the following properties: M.P. about 257–262°; $[\alpha]_D^{23}$ +86° (c., 0.31 in dioxane);

$\lambda_{max.}^{alc.}$ 243 m$\mu$ ($\epsilon$=15,100); $\lambda_{max.}^{Nujol}$ 2.90$\mu$, 3.00$\mu$, 5.74$\mu$, 6.04$\mu$, 6.21$\mu$, 6.26$\mu$

*Analysis.*—Calculated for $C_{21}H_{27}O_4F$ (362.42): C, 69.59; H, 7.50; F, 5.24. Found: C, 69.76; H, 7.42; F, 4.92.

EXAMPLE 12

*21-fluoro-$\Delta^4$-pregnene-11$\beta$,17$\alpha$-diol-3,20-dione and $\Delta^4$-pregnene-17$\alpha$,21-oxido-11$\beta$-ol-3,20-dione*

A solution of 305 mg. of hydrocortisone 21-mesylate and 320 mg. of anhydrous potassium fluoride in 17 ml. of dimethylsulfoxide is heated at 110° with stirring for 18 hours. The cooled mixture is diluted with water and extracted with ethyl acetate. The ethyl acetate extract is washed back with water, dried over sodium sulfate and evaporated to dryness in vacuo. The residue (about 233 mg.) is heated with chloroform and thereby separated into the insoluble 21-fluoro-$\Delta^4$-pregnene-11$\beta$,17$\alpha$-diol-3,20-dione and into the chloroform-soluble 17$\alpha$,21-oxide.

The chloroform-insoluble 21-fluoro derivative (about 80 mg.) after recrystallization from 95% alcohol has the following properties: M.P. about 242–244°; $[\alpha]_D^{23}$ +163° (c., 0.39 in alcohol);

$\lambda_{max.}^{alc.}$ 242 m$\mu$ (15,000); $\lambda_{max.}^{Nujol}$ 2.87, 3.05, 5.84, 6.05–6.10, 6.20$\mu$

*Analysis.*—Calculated for $C_{21}H_{29}O_4F$ (364.44): C, 69.24; H, 8.02; F, 5.34. Found: C, 69.29; H, 8.09; F, 5.46.

The chloroform-soluble 17$\alpha$,21-oxide fraction is dissolved in 4 ml. chloroform and 16 ml. of benzene and chromatographed on 5 g. of acid-washed alumina. Elution with chloroform-benzene 1:4 (200 ml.) produces about 83 mg. of material, which after recrystallization from acetone has the following properties: M.P. about 244–246°; $[\alpha]_D^{23}$ +237° (c., 0.62 in CHCl$_3$);

$\lambda_{max.}^{alc.}$ 241 m$\mu$ (16,300); $\lambda_{max.}^{Nujol}$ 2.96, 5.55, 6.09, 6.19$\mu$

*Analysis.*—Calculated for $C_{21}H_{28}O_4$ (344.44): C, 73.22; H, 8.19. Found: C, 72.70; H, 7.88.

EXAMPLE 13

*12$\alpha$,21-difluoro-$\Delta^4$-pregnene-11$\beta$,17$\alpha$-diol-3,20-dione*

By substituting 200 mg. of 12$\alpha$-fluorohydrocortisone 21-mesylate for the 9$\alpha$-fluorohydrocortisone 21-mesylate in the process of Example 1, there is obtained 12$\alpha$,21-difluoro-$\Delta^4$-pregnene-11$\beta$,17$\alpha$-diol-3,20-dione.

EXAMPLE 14

*9$\alpha$,21-difluoro-$\Delta^4$-pregnene-11$\beta$,16$\alpha$,17$\alpha$-triol-3,20-dione*

By substituting 50 g. of 9$\alpha$-fluoro-16$\alpha$-hydroxyhydrocortisone 16-acetate 21-mesylate (prepared by treating 9$\alpha$-fluoro-16$\alpha$-hydroxyhydrocortisone 16-monoacetate with mesyl chloride in the presence of pyridine) for the 9$\alpha$-fluorohydrocortisone 21-mesylate in the procedure of Example 2, there is obtained 9$\alpha$,21-difluoro-$\Delta^4$-pregnene-11$\beta$,16$\alpha$,17$\alpha$-triol-3,20-dione.

The invention may be otherwise variously embodied within the scope of the appended claims.

What is claimed is:

1. A process for preparing a 21-fluoro steroid of the pregnane series which comprises interacting a 21-organic sulfonyloxy steroid of the pregnane series with an alkali metal fluoride salt in an organic solvent of high dielectric constant, and recovering the 21-fluoro steroid formed.

2. The process of claim 1 wherein the alkali metal fluoride is an alkali metal bifluoride.

3. A process for preparing 9$\alpha$-halo-21-fluoro-21-desoxyhydrocortisone which comprises interacting 9$\alpha$-halohydrocortisone 21-(lower alkane)sulfonate with an alkali metal fluoride in an organic solvent of high dielectric constant.

4. The process of claim 3 wherein the steroid reactant is 9$\alpha$-fluorohydrocortisone 21-mesylate.

5. A process for preparing 9$\alpha$-halo-21-fluoro-$\Delta^{1,4}$-pregnadiene-11$\beta$,17$\alpha$-diol-3,20-dione which comprises interacting 9$\alpha$ - halo-$\Delta^{1,4}$-pregnadiene-11$\beta$,17$\alpha$,21-triol-3,20-dione 21-(lower alkane)sulfonate with an alkali metal fluoride in an organic solvent of high dielectric constant.

6. The process of claim 5 wherein the steroid reactant is 9$\alpha$ - fluoro-$\Delta^{1,4}$-pregnadiene-11$\beta$,17$\alpha$,21-triol-3,20-dione 21-mesylate.

7. A process for preparing 21-fluoro-9$\beta$,11$\beta$-epoxy-$\Delta^4$-pregnene-17$\alpha$-ol-3,20-dione which comprises interacting 9$\beta$,11$\beta$ - epoxy - $\Delta^4$ - pregnene-17$\alpha$,21-diol-3,20-dione 21-(lower alkane)sulfonate with an alkali metal fluoride in an organic solvent of high dielectric constant.

8. The process of claim 7 wherein the steroid reactant is 9$\beta$,11$\beta$-epoxy - $\Delta^4$ - pregnene-17$\alpha$,21-diol-3,20-dione 21-mesylate.

9. A process for preparing 21-fluoro-$\Delta^{1,4}$-pregnadiene-11$\beta$,17$\alpha$-diol-3,20-dione which comprises interacting $\Delta^{1,4}$-pregnadiene-11$\beta$,17$\alpha$,21 - triol - 3,20-dione 21-(lower alkane)-sulfonate with an alkali metal fluoride in an organic solvent of high dielectric constant.

10. The process of claim 9 wherein the steroid reactant is $\Delta^{1,4}$-pregnadiene-11$\beta$,17$\alpha$,21-triol-3,20-dione 21-mesylate.

11. A process for preparing 21-fluoro-21-desoxyhydrocortisone which comprises interacting hydrocortisone 21-(lower alkane)sulfonate with an alkali metal fluoride in an organic solvent of high dielectric constant.

12. The process of claim 11 wherein the steroid reactant is hydrocortisone 21-mesylate.

13. A process for preparing a 21-fluoro-steroid of the pregnane series which comprises interacting a 21-organic sulfonyloxy steroid of the pregnane series with potassium bifluoride in an organic solvent of high dielectric constant, and recovering the 21-fluoro steroid formed.

14. The process of claim 13 wherein the 21-organic sulfonyloxy steroid is a 21-(lower alkane)sulfonate.

15. The process of claim 13 wherein the 21-organic sulfonyloxy steroid is a 21-methanesulfonate.

References Cited in the file of this patent

Journal American Chemistry Society, Tannhauser et al., vol. 78, page 2658, June 5, 1956.